United States Patent [19]

Phadke

[11] Patent Number: 5,244,972
[45] Date of Patent: * Sep. 14, 1993

[54] SINGLE STEP BULK PROCESS FOR HIGH IMPACT POLYESTER MASTERBATCHES, PRODUCTS THEREOF AND BLENDS WITH POLYESTERS

[75] Inventor: Shrikant V. Phadke, Baton Rouge, La.

[73] Assignee: General Electric Company, Pittsfield, Mass.

[*] Notice: The portion of the term of this patent subsequent to Jun. 25, 2008 has been disclaimed.

[21] Appl. No.: 564,694

[22] Filed: Aug. 7, 1990

Related U.S. Application Data

[63] Continuation of Ser. No. 235,315, Aug. 23, 1988, abandoned, which is a continuation-in-part of Ser. No. 183,437, Apr. 13, 1988, abandoned, which is a continuation of Ser. No. 4,090, Jan. 16, 1987, abandoned.

[51] Int. Cl.$^5$ ............... C08L 67/02; C08L 77/00
[52] U.S. Cl. ........................... 525/66; 525/64; 525/168; 525/177; 525/181; 525/184
[58] Field of Search .............. 525/64, 66, 168, 176, 525/177, 181, 184

[56] References Cited

U.S. PATENT DOCUMENTS

| | | | |
|---|---|---|---|
| 3,769,260 | 10/1973 | Segal | 524/494 |
| 3,862,265 | 1/1975 | Steinkamp | 264/176 R |
| 3,868,433 | 2/1975 | Bartz | 156/327 |
| 3,884,882 | 5/1975 | Caywood | 525/205 |
| 3,886,227 | 5/1975 | Van Brederode | 525/286 |
| 3,953,541 | 4/1976 | Fuji | 525/286 |
| 4,026,967 | 5/1977 | Flexman | 525/286 |
| 4,172,859 | 10/1979 | Epstein | 525/109 |
| 4,612,155 | 9/1986 | Wong | 525/177 |

FOREIGN PATENT DOCUMENTS 60-40154  3/1985  Japan.

*Primary Examiner*—Patricia A. Short

[57] ABSTRACT

A molding composition having improved toughness and impact strength comprising 60-90 percent by weight of a matrix resin in the form of a polyester or polyamide resin, reacted with 40-10 percent by weight of a rubber formed by copolymerization of ethylene, one or more mono-olefins, and preferably one or more polyenes, and an ester of an alpha, beta-unsaturated acid having an epoxide functionality on the alkoxy portion. The composition is prepared by forming a masterbatch containing the backbone rubber, a monomer having the epoxide functionality, a catalyst and a portion of the matrix resin of the final composition in a single step bulk process, and thereafter blending the masterbatch with the remainder of the matrix resin.

15 Claims, No Drawings

SINGLE STEP BULK PROCESS FOR HIGH IMPACT POLYESTER MASTERBATCHES, PRODUCTS THEREOF AND BLENDS WITH POLYESTERS

This application is a continuation of U.S. patent application Ser. No. 235,315, filed on Aug. 23, 1988, now abandoned, which is a continuation-in-part of U.S. patent application Ser. No. 183,437, filed Apr. 13, 1988, now abandoned, which is a continuation of U.S. patent application Ser. No. 004,090, filed Jan. 16, 1987, now abandoned and entitled "Single Step Bulk Process For High Impact Polyester Masterbatches, Products Thereof And Blends With Polyesters".

FIELD OF THE INVENTION

This invention is an improvement over the invention described in the copending U.S. patent applications Ser. No. 690,613, filed Jan. 11, 1985 and entitled "Polyesters Having Improved Impact Strength", and Ser. No. 800,333, filed Nov. 21, 1985, also entitled "Polyesters Having Improved Impact Strength". The invention relates to polyester polymeric materials and particularly polybutylene terephthalate having improved toughness and impact strength and to materials and methods for producing same. It also relates to polyamide resins having improved toughness and impact strength as well as materials and methods for achieving same.

The invention will hereinafter be described primarily with respect to the thermoplastic polyester resins but it will be understood that the concepts will have similar applications to the improvement of the strength properties of polyamide resins.

DESCRIPTION OF THE PRIOR ART

As described in the aforementioned copending applications, the utility of thermoplastic polyesters in engineering type applications is limited where toughness and high impact strength are required. Unmodified thermoplastic polyesters typically exhibit room temperature impact strengths of 1 ft.-lb./inch of notch or less on the Izod scale of impact strength.

Improvement of the toughness and impact strength of thermoplastic polyester has been the subject matter of considerable research and development by the most highly skilled in the art. Much of such earlier research and development has been addressed to the admixture of additives to the polyester, with particular attention being given to the addition of rubber-like or elastomeric materials, such as ethylene-propylene copolymers (EPM) or ethylene propylene-polyene terpolymers (EPDM), with a view towards improving impact strength and toughness without interfering with other of the desirable properties of the polyester. The desired level of improvement has not been achieved with the addition of such rubber-like or elastomeric materials by reason of the relative incompatibility between such rubber-like or elastomeric materials and polyester resins.

Attempts have been made to overcome this problem and increase the compatibility between the rubber-like or elastomeric materials and polyester resins by modification of the rubber-like or elastomeric materials with sites that enable the polyester resins to adhere to the elastomeric materials.

Cope, in U.S. Pat. No. 3,435,093 discloses blends of polyethylene terephthalate and an ionic hydrocarbon copolymer of alpha-olefins of the formula $R-CH=CH_2$ in which R is hydrogen (ethylene) or an alkyl radical of 1-3 carbon atoms (propylene-pentene) with the copolymer modified with an alpha, beta-ethylenically unsaturated carboxylic acid containing 3-5 carbon atoms. The Cope patent does not teach or suggest the components of the additive employed or the concepts employed in the practice of the invention described and claimed herein, as will hereinafter appear.

The problem was faced directly in the Epstein U.S. Pat. No. 4,172,859, issued Oct. 30, 1979. The Epstein patent is somewhat confusing in that it seeks to cover the waterfront by listing an endless number of materials and combinations thereof for use as additives to improve the toughness and impact strength of polyester and polycarbonate resins. In the Epstein patent, emphasis is placed on the importance of the particle size and tensile modulus of the copolymer additive. While Epstein contemplates the use of ethylene-propylene copolymers and ethylene-propylene-polyene terpolymers, from amongst the large number of other varieties of materials, and the use of alpha, beta-ethylenically unsaturated carboxylic and dicarboxylic acids and anhydrides as modifying agents to provide sites which adhere to the matrix resin, the Epstein patent does not recognize the concepts of the invention described and claimed as will hereinafter be pointed out.

In the aforementioned copending application Ser. No. 690,613, of which this is an improvement, the invention described therein is based on the thought that an ethylene, $C_3$–$C_{16}$ mono-olefin, polyene and preferably an ethylene, propylene, diene rubbery interpolymer would make a good impact modifier for thermoplastic polyester, if the two could be made compatible. The two are relatively incompatible because the rubber is a hydrocarbon while the polyester is a much more polar substance. Thus, the objective of the invention described and claimed therein was addressed to the modification of the ethylene, mono-olefin, polyene interpolymer rubber greatly to improve its compatibility with polyester to provide an improved impact modifier for the thermoplastic polyester resin.

Briefly described, the features of the invention of the copending application are embodied in a composition comprising 60-90 percent by weight of a matrix resin in the form of a polyester blended with 40-10 percent by weight of an unsaturated rubber formed by copolymerization of ethylene, one or more mono-olefins, and one or more polyenes in which the backbone unsaturated rubber component has been modified with an ester of an alpha, beta-unsaturated acid having an epoxide functionality on the alkoxy portion, such as the ester derived from methacrylic acid and an epoxy alcohol, and which is attached to the backbone rubber chiefly by way of a grafting reaction with little if any cross-linking reaction.

Copending application (Ser. No. 800,333) describes an improvement over the invention described and claimed in the aforementioned copending application Ser. No. 690,613 in that controlled cross-linking of the rubber backbone phase (EPDM) of the grafted modifier provides a significant improvement in the knitline strength of the final blend with the matrix (polyester) resin, when the cross-linking reaction is carried out after proper dispersion of the grafted rubber phase in the plastic matrix resin. For this purpose, use is made of a cross-linking agent in the form of a compound having functionalities capable of reaction with the grafted rubber, such as di- or poly-amines, anhydrides, and acids such as hexamethylene diamine (HDA), melamine, benzophenone tetracarboxylic dianhydride, adipic acid, maleic acid, maleic anhydride and the like.

Polyesters and their method of manufacture are well known to the skilled in the art and are readily available in commerce and, therefore, detailed description thereof will not be given herein. The invention will be described herein with reference to polybutylene terephthalate as a preferred polyester, such as marketed by the General Electric Company under the trademark Valox 310 and Valox 315, although others of the polyesters, such as described in the above-mentioned Epstein U.S. Pat. No. 4,172,859, could be used in the practice of the described invention for their improvement in toughness and impact strength.

BRIEF DESCRIPTION OF THE INVENTION

Briefly described, the features of this invention are embodied in a thermoplastic molding composition comprising 60-90 percent by weight of a matrix resin in the form of a polyester or polyamide resin reacted with 40-10 percent by weight of a rubber formed by copolymerization of ethylene, one or more mono-olefins, and preferably with one or more polyenes, and an ester of an alpha, beta-unsaturated acid having an epoxide functionality on the alkoxy portion, such as the ester derived from methacrylic acid and an epoxy alcohol.

It has been found, in accordance with the practice of this invention, that desirable improvements in strength properties and in the economy of manufacture can be achieved when the materials are first formulated into a masterbatch containing the backbone rubber, a monomer having an epoxide functionality, and a catalyst, all of which are combined for reaction with a fraction of the matrix resin. The final product is thereafter formed by admixture or preferably thermal blending of the formed masterbatch material with the remainder of the matrix resin to form the final thermoplastic composition, from which various products can be molded having the described improved strength properties.

In the practice of this invention the masterbatch is formed by a single step bulk process wherein the separate ingredients forming the masterbatch are combined for reaction in a melt processing equipment, such as an extruder, Banbury mixer, or other melt processing equipment. This not only eliminates the need to prepare separately a grafted rubber and its subsequent dispersion in the less than full amount of matrix resin, but it also permits a different reaction between the ingredients whereby a more desirable and uniform system is obtained which functions more effectively in the final combination with the remainder of the matrix resin to yield products molded therefrom, having improved properties.

DETAILED DESCRIPTION OF THE INVENTION

As the backbone rubber component, it is preferred to make use of an interpolymer rubber of ethylene, one or more mono-olefins having from 3-16 carbon atoms, preferably propylene, and one or more polyenes (EPDM). In the practice of this invention, the rubber component of the masterbatch can be substituted in whole or in part by an ethylene-$C_1$-$C_{12}$ mono-olefin copolymer.

As the copolymer rubber, use can be made of an ethylene-mono-olefin and preferably an ethylene-propylene (EPM) copolymer rubber formed by copolymerization in solvent solution, in the presence of a Ziegler-type catalyst, of ethylene and one or more mono-olefins, preferably propylene, but which may include 1-butene, 1-pentene, or other mono-olefins having 3-12 carbon atoms. The ratio of ethylene to propylene or $C_3$—$C_{12}$ mono-olefins may range from 10-95 moles of ethylene to 90-5 moles of propylene or other mono-olefins. The preferred range of ethylene to propylene or other mono-olefin is 45-75 moles of ethylene to 55-25 moles of propylene or other mono-olefin.

In the preparation of the interpolymer rubber, the polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4-20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo(2,2,1) heptane wherein at least one double bond is present in one of the bridged rings, such as dicyclopentadiene, bicyclo(2,2,1)hepta-2,5-diene, the alkylidene norbornenes, and especially the 5-alkylidene-2-norbornenes wherein the alkylidene group contains 1-20 carbon atoms and preferably 1-8 carbon atoms, the alkenyl norbornenes, and especially the 5-alkenyl-2-norbornenes wherein the alkenyl group contains about 3-20 carbon atoms and preferably 3-10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene.

The EPDM backbone rubber may contain chemically bound therein molar ratios of ethylene to propylene or other $C_3$-$C_{16}$ mono-olefin varying between 95:10 to 5:90 ethylene:propylene, and preferably between 70:30 to 55:45 ethylene:propylene. The polyene or substituted polyene may be chemically bound therein in an amount of 0.1 to 10 mole percent, and preferably 0.3 to 10 mole percent. The level of unsaturation in the backbone rubber may range from 2-20 double bonds per 1000 carbon atoms in the polymer chain.

The interpolymerization is carried out in the presence of a Ziegler catalyst of the type well known to the prior art. Such Ziegler-type catalysts are disclosed in a large number of patents, such as U.S. Pat. Nos. 2,933,480; 3,093,620; 3,093,621; 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organic-metallic compound of a metal of groups I, II, or III of the Mendeleeff periodic system which contains at least one carbon-metal bond, such as trialkyl aluminum, and alkyl aluminum halides in which the alkyl groups contain from 1-20 and preferably 1-4 carbon atoms.

The preparation of the rubbery copolymer (EPM) or the interpolymer EPDM is well known and is fully described in such patents as U.S. Pat. Nos. 2,993,480; 3,093,621; 3,211,709; 3,646,168; 3,790,519; 3,884,993; 3,894,999 and 4,059,654, amongst many others.

As the ester of a methacrylic acid which has an epoxide functionality on the alkoxy portion, it is preferred to make use of glycidyl methacrylate, although other epoxy compounds having the following general formula may be used:

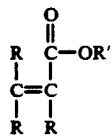

in which R' is an organic group having an epoxide functionality and R is hydrogen, methyl, ethyl, propyl or other alkyl, aralkyl, cyclic, or aromatic group. Representative of such other modifying agents are glycidyl acrylate, glycidyl 2-ethylacrylate, glycidyl 2-propylacrylate and the like.

The desired results are achieved when the amount of epoxide component charged is within the range of 2–15 parts by weight per 100 parts by weight of the backbone rubber.

The reaction to form the masterbatch is carried out in the presence of a peroxide catalyst such as a dialkyl peroxide, dicumyl peroxide, t-butyl hydroperoxide, benzoyl peroxide, t-butylperoctanoate, di-t-butylperoxide, cumene hydroperoxide, t-butylperbenzoate, 2,5-dimethyl-2,5-di-(t-butylperoxy) hexane, or other free radical source capable of hydrogen abstraction, as represented by alkyl peroxy esters, alkyl peroxides, alkyl hydroperoxides, diacylperoxides and the like, which is added with the EPDM or EPM, reactive agent, and matrix resin in bulk, to the reaction chamber.

In order to achieve the desired improvements in impact strength, it is desirable to make use of an initiator in an amount of at least about 0.3 percent by weight of the rubber. While more than 3 percent by weight initiator can be used to achieve the desired results, it is preferred to limit the upper range to about 3 percent by weight of the rubber. An amount of catalyst less than about 0.3 percent by weight of the unsaturated rubber can be used, but the amount of working required to achieve the desired improvements often results in an undesirable amount of degradation of the backbone rubber.

In accordance with the practice of this invention, the reaction to form the masterbatch is carried out in the presence of a portion of the matrix (polyester or polyamide) resin making up the final product. The desired improvements can be obtained when the reaction is carried out in combination with 10–80 percent and preferably within the range of 20–50 percent by weight of the amount of matrix resinous component of the final product. This intermediate reaction product, which contains some of the matrix resin, is referred to herein as a masterbatch with which the remainder of the matrix resin can be blended. Optimum results are secured when the rubbery polymer and matrix resin in the masterbatch are present in the ratio of 50–80 parts by weight rubbery polymer to 50–20 parts by weight matrix resin and preferably 60–80 parts by weight rubbery polymer to 40–20 parts by weight matrix resin.

The masterbatch that is formed appears to have improved compatibility with the remainder of the matrix resin subsequently blended therewith to provide a more uniform product. The initial reaction to form the masterbatch is carried out preferably, from the standpoint of simplicity, cost and equipment, by a mastication process or in melt processing equipment wherein the various components are worked together in their solid states, such as in an internal mixer, extruder and the like at elevated temperatures such as at a temperature within the range of 350°–550° F. and preferably 400°–500° F. Blending of the masterbatch with the remainder of the matrix resin can be carried out under similar conditions while the ingredients are in the form of a hot melt or plastic state.

EXAMPLE 1

The following example illustrates the process wherein the full increment of matrix resin is reacted with the other ingredients to form the final molding composition in a single step.

The following composition was extruded three times through a 1", 20/1 L/D, single-screw (Killion) extruder at the temperatures of 450° F. in the barrel and 425° F. in the die. Composition: 100 grams of a 2.2 RSV 66/34 (molar ratio) ethylene/propylene, 8 weight percent ethylidene norbornene EPDM polymer (EPsynR 55, Copolymer Rubber & Chemical Corporation, Baton Rouge, La.), 422 grams of polybutylene terephthalate (Valox 315, General Electric Company), 5 grams of glycidyl methacrylate, and 0.5 grams of 2,5-dimethyl-2,5-di (t-butylperoxy) hexane. The extruded strands were air-cooled and chopped into pellets. The pellets were molded into test specimens for tensile and notched Izod impact strength using a plunger injection molder with a cavity temperature of 525°–535° F. and a mold temperature of 200° F.

The following examples illustrate the practice of this invention in first forming a masterbatch in which a portion of the matrix resin is pre-reacted with the backbone rubber and epoxide functionality.

EXAMPLE 2

A composition consisting of 160 grams of EPsyn 55, 53 grams of Valox 315, 12 grams of glycidyl methacrylate, and 1.2 grams of 2,5-dimethyl-2,5-di(t-butylperoxy) hexane was extruded three times through a 1", 20/1 L/D, single-screw (Killion) extruder at the temperatures of 425° F. in the barrel and 400° F. in the die. The extruded strands were air-cooled and chopped into pellets.

EXAMPLE 3

A composition consisting of 188.2 grams of the pellets prepared in Example 2 and 517.5 grams of Valox 315 was extruded three times through a 1", 20/1 L/D single-screw (Killion) extruder at the temperatures of 450° F. in the barrel and 425° F. in the die. The extruded strands were air-cooled and chopped into pellets. The pellets were molded into test specimens for tensile and notched Izod impact strengths as described in Example 1. The pellets were also molded into test specimens for knitline impact strength using a double-gated mold on a screw injection molder.

EXAMPLE 4

The same as Example 2, except 160 grams of Valox 315 were used instead of 53 grams.

EXAMPLE 5

A composition consisting of 291.7 grams of pellets from Example 4 above and 437.6 grams of Valox 315 was extruded, pelletized and molded into test specimens as described in Example 3.

EXAMPLE 6

This is similar to Example 2, except adipic acid was used as an additional ingredient and the quantities of the various ingredients used were as follows: 900 grams of EPsyn 55, 300 grams of Valox 315, 67.5 grams of glycidyl methacrylate, 6.75 grams of 2,5-dimethyl-2,5-di(t-butylperoxy) hexane, and 7.02 grams of adipic acid.

EXAMPLE 7

A composition consisting of 106.7 grams of pellets from Example 6 above and 293.3 grams of Valox 315 was extruded, pelletized and molded into test specimens as described in Example 3.

The molded samples prepared in all the above examples were stored in moisture-proof polyethylene bags for at least 16 hour prior to testing. The test methods were as follows:

(a) Notched Izod impact strength: ASTM D256.
(b) Knitline Izod impact strength was measured on unnotched double-gated samples. Except for this variation, the procedure was similar to ASTM D256.
(c) Tensile strength was measured according to ASTM D638.

The results of the above tests are listed in Table I.

EXAMPLE 8

Same as Example 2, except that glycidyl acrylate is used instead of glycidyl methacrylate, and the base rubber is 2.8 RSV ethylene-propylene copolymer having an ethylene: propylene molar ratio of 65:35.

EXAMPLE 9

The base rubber is the EPDM of Example 1. The rubber feed rate was 6.6 pounds per hour to a Werner and Pfleiderer ZSK twin screw extruder operating at a barrel temperature of 200° C. and a screw speed of 150 rpm. Glycidyl methacrylate and 2,5-dimethyl-2,5-di(t-butylperoxy) hexane initiator were fed continuously at rates of 7.6 parts per hundred GMA and 0.30 parts per hundred initiator per 100 parts by weight EPDM. The resulting reaction product had a gel content of 5.0 percent.

It will be understood that changes may be made in the details of formulation and operation, without departing from the spirit of the invention, especially as defined in the following claims.

What is claimed is:

1. The method of producing a thermoplastic polyester or polyamide based composition having improved toughness and impact strength comprising first forming a masterbatch by reacting in a single step in the presence of a free radical initiator less than the full increment of the polyester or polyamide matrix resin constituting from about 10 to about 80 percent by weight of the amount of matrix resin with a backbone rubber selected from the group consisting of a rubber compo-

TABLE I

Properties of Samples Molded From Final Blends

| | Percent Valox 315 in | | | Izod Impact Strength ft. lbs./in. | | |
|---|---|---|---|---|---|---|
| | | | | Notched | | Unnotched Knitline |
| Example | Masterbatch | Final Blend | Tensile Strength, psi | @ 25° C. | @ 20° C. | @ 25° C. |
| 1* | 81 | 81 | 3820 | 1.2 | — | — |
| 3 | 23.43 | 79.6 | 4260 | 12.4 | 3.04 | 18.0 |
| 5 | 48.02 | 79.2 | 4200 | 12.1 | 3.06 | 12.7 |
| 7 | 23.41 | 79.6 | 4070 | 12.8 | 3.3 | 17.5 |

*In this case, the final blend is the same as the masterbatch.

It will be seen from the above, by comparison of Example 1 with Examples 3, 5 and 7, that the strength properties, and in particular, the notched and unnotched impact strengths are greatly improved, in accordance with the practice of this invention, when use is made of a masterbatch containing a portion of the matrix resin pre-reacted with the EPDM rubber and epoxy compound in the presence of a peroxide catalyst.

Similar improvements in strength properties are produced when a polyamide resin is substituted in equivalent amounts for the polyester resins in the foregoing examples.

As previously pointed out, the unsaturated EPDM backbone rubber can be substituted in whole or in part by an EPM backbone rubber containing no unsaturated groups, especially when the reactive agent is a glycidyl acrylate. The preparation of suitable EPM rubbers is well known to the skilled in the art, reference being made to copending application Ser. No. 537,789, filed Sep. 30, 1983.

nent formed by interpolymerization of ethylene, one or more $C_3$-$C_{16}$ mono-olefins, and a polyene, a copolymer rubber formed by the copolymerization of ethylene and one or more mono-olefins containing 3-16 carbon atoms, and mixtures thereof, and an ester of acrylic or methacrylic acid having an epoxide functionality, said ester having an epoxide functionality be present in an amount within the range of 2-15 parts by weight per 100 parts by weight of said backbone rubber, and thereafter blending the master batch with the remainder of the matrix resin.

2. The method as claimed in claim 1, in which the ethylene, mono-olefin, polyene interpolymer rubber is an ethylene, propylene, 5-ethylidene-2-norbornene interpolymer rubber.

3. The method as claimed in claim 2, in which the ethylene and propylene are present in the bound state in the interpolymer in the ratio of 45-75 moles ethylene to 55-25 moles propylene.

4. The method as claimed in claim 2, in which the polyene is present in an amount to provide 2-20 C═C groups per 1000 carbon atoms in the interpolymer.

5. The method as claimed in claim 4, in which the ester of methacrylic acid is glycidyl methacrylate.

6. A polyester based thermoplastic molding composition produced by the method of claim 5.

7. The method as claimed in claim 4, in which the ester of acrylic acid is glycidyl acrylate.

8. The method as claimed in claim 1, in which the ethylene, mono-olefin copolymer rubber is an ethylene-propylene rubber.

9. The method as claimed in claim 8, in which the ethylene and propylene are present in the bound state in the ratio of 10–95 moles ethylene to 90–5 moles propylene.

10. The method as claimed in claim 1, in which the reaction is carried out at an elevated temperature in the presence of a peroxide catalyst present in an amount within the range of about 0.3–3.0 parts per 100 parts by weight of the backbone rubber.

11. The method as claimed in claim 1, in which the masterbatch is formulated to contain 20–60 percent of the matrix resin present in the final blend.

12. The method as claimed in claim 1, in which the ratio of backbone rubber to matrix resin in the masterbatch is within the range of 50–80 parts by weight backbone rubber to 50–20 parts by weight matrix resin.

13. The method as claimed in claim 1, in which the ratio of backbone rubber to matrix resin in the masterbatch is within the range of 60–80 parts by weight backbone rubber to 40–20 parts by weight matrix resin.

14. The method as claimed in claim 1, in which the reaction to form the masterbatch is carried out at a temperature within the range of 350°–550° F.

15. A polyester based thermoplastic molding composition produced by the method of claim 1.

* * * * *